United States Patent [19]
Chang et al.

[11] Patent Number: 5,289,470
[45] Date of Patent: Feb. 22, 1994

[54] FLEXIBLE SCHEME FOR BUFFER SPACE ALLOCATION IN NETWORKING DEVICES

[75] Inventors: Shu-Ping Chang, Shrub Oak; Ahmed N. Tantawy, Yorktown Heights, both of N.Y.

[73] Assignee: International Business Machines Corp., Armonk, N.Y.

[21] Appl. No.: 990,162

[22] Filed: Dec. 14, 1992

[51] Int. Cl.⁵ .................................. H04J 3/24
[52] U.S. Cl. ....................... 370/94.1; 395/250; 379/89
[58] Field of Search .............. 370/94.1, 60, 94.2, 370/60.1, 85.1, 85.2, 85.3, 85.4, 85.6, 85.15; 395/425, 250, 115, 164, 165; 340/825.15; 379/88, 89

[56] References Cited
U.S. PATENT DOCUMENTS

| | | |
|---|---|---|
| 4,349,875 | 9/1982 | Tada . |
| 4,677,616 | 6/1987 | Franklin . |
| 4,736,369 | 4/1988 | Barzilai et al. . |
| 4,864,495 | 9/1989 | Inaba ................... 370/94.1 |
| 4,933,932 | 6/1990 | Quinquis et al. ........... 370/94.1 |
| 5,014,265 | 5/1991 | Hahne et al. . |
| 5,016,248 | 5/1991 | Kudoh ................... 370/94.1 |
| 5,083,269 | 1/1992 | Syobatake et al. ........... 370/94.1 |
| 5,125,096 | 5/1992 | Brantley, Jr. et al. . |
| 5,189,672 | 2/1993 | Le Bihan ................ 370/94.1 |

*Primary Examiner*—Douglas W. Olms
*Assistant Examiner*—Ajit Patel
*Attorney, Agent, or Firm*—Ratner & Prestia

[57] ABSTRACT

A method and apparatus for storing a data packet in a networking device. The networking device has a plurality of buffers. Each buffer has a respective size. A predetermined, ordered sequence of buffer sets is established. A buffer is allocated from the plurality of buffers. The allocated buffer is selected from the first set in the ordered sequence. If the packet size does not exceed the allocated buffer size, the entire packet is stored in the allocated buffer. Otherwise, a portion of the data packet sufficient to fill the allocated buffer is stored into the allocated buffer. If the packet size is greater than the size of the allocated buffer, further portions of the data packet are stored into respective further buffers. The further buffers are allocated from the plurality of sets of buffers. The further buffers are allocated so that the sequence of their respective sizes match the predetermined, ordered sequence of sets of buffers.

16 Claims, 6 Drawing Sheets

FLEXIBLE SCHEME FOR BUFFER SPACE ALLOCATION IN NETWORKING DEVICES

BACKGROUND OF THE INVENTION

1. Field of the Invention

The present invention is related to communications and in particular to the allocation of buffer space in a networking device for temporary storage of data which is transferred between networks or between a host processor and a communications network.

2. Description of the Related Art

Networking devices (NDs) are used in computer networks to perform communications tasks, such as offloading communications related processing from the host processor. The ND is interposed between multiple networks, or the host processor and the network to which it is attached. The ND has processing units and memory, and it executes communication specific tasks.

In a networking device, such as a bridge, a router or a host network adaptor, data packets are received from the attached network and are stored in buffers. Then, they are forwarded to the on-board processing unit (if one is included in the ND), to the host system, or to another network. A special buffer memory is used for the purpose of storing data packets before forwarding them.

Several methods have been used to allocate buffer space for incoming packets, and to release that space after the associated packets are forwarded. In general, the entire buffer memory is partitioned into a number of buffers having a fixed size, in order to simplify the memory management operation. Two buffer memory management methods have been widely used.

The first method employs buffers which have a single size. The number of buffers used to store a packet is limited to a predetermined maximum number. Some systems use a single buffer to store the whole data packet, whereas other systems include multiple buffers to store a packet. If a single buffer is used, its size must be large enough to contain any packet received by the ND. The single buffer allocation scheme is very simple (each packet is assigned to one buffer), but the buffer memory utilization may be extremely inefficient. This is particularly true if the packets vary in size.

On the other hand, to overcome the low memory utilization problem, the buffer memory may be partitioned into small buffers; and every packet is stored in as many buffers as needed to contain the entire packet. This, however, results in a more complex buffer memory management scheme, because all the buffers used for a given packet must be linked together in some fashion, so that they are retrieved when the packet is forwarded as an entity.

The second method employs a plurality of different buffer sizes. The buffer memory is partitioned into multiple sets of buffers, each set having buffers of a given size. Each data packet is stored in a single buffer which is large enough to contain the packet. Different sets include buffers of different sizes. This method may, however introduce additional complexity if the length of the received data packet is not given in its header. In that case, the appropriate buffer pool cannot be selected until the entire packet is received in a temporary storage element and its total size is identified. This can lengthen the time required to store the packet into the buffer.

The buffer memory allocation scheme inside the networking device is an important factor affecting system throughput and utilization. More precisely, the buffer memory inside the ND is managed by a buffer memory management unit (e.g., an on-board general purpose or specialized processor). Every buffer allocation causes management overhead. The allocation of buffer space is a relatively time consuming process for the ND's processor to execute. The allocation process may require a large number of clock cycles per data packet for memory management operations (e.g., management of queues when a packet is received and when it is released after transmission). Furthermore, if multiple buffers are allocated for one received packet, management overhead also becomes larger and the system throughput suffers because of the limitation on the number of buffers that are handled per unit of time by the buffer memory management unit.

In prior systems, to reduce the management overhead, a single buffer for every packet has been used to achieve minimum overhead. However, to accommodate one packet in a single buffer requires that the buffer size be the size of the largest packet which may possibly be received. For example, 4500 byte buffers would be required for a fiber distributed data interface (FDDI) network. In this case, if small packets are more likely to be received or transmitted in a given environment, the actual utilization of the buffer memory becomes very low. This is a problem because the ND is unable to store further packets which it receives, after it runs out of buffers. These further packets are then lost, even though the buffer memory may have large amounts of unused space.

Accordingly, it is desired to allocate buffer space so that a reasonable balance is maintained between the buffer memory utilization and the memory management overhead.

SUMMARY OF THE INVENTION

The present invention is embodied in a method and apparatus for storing a data packet in a networking device. The networking device has a plurality of buffers. Each buffer has a respective size.

The plurality of buffers is partitioned into a plurality of sets of buffers. Each set has buffers of a respectively different size. An ordered sequence of buffer sets is established. One of the sets is the first set in the ordered sequence. A buffer from the first set is allocated. A portion of the data packet is stored into the allocated buffer.

If the packet size is greater than the size of the allocated buffer, a further buffer is allocated from a further buffer set in accordance with the ordered sequence of buffer sets. A further portion of the data packet is stored into the further buffer, and this step is repeated until the entire data packet is received.

DESCRIPTION OF THE EXEMPLARY EMBODIMENTS

Overview

Figure 1:
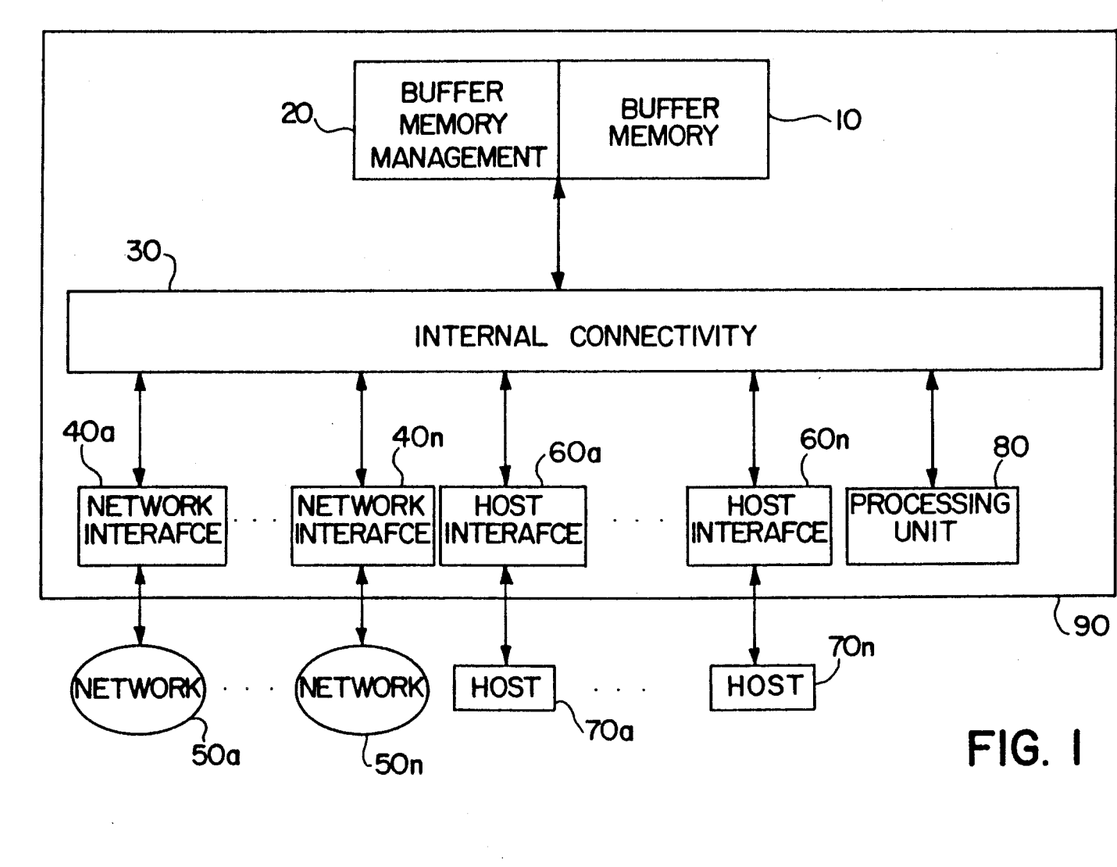
FIG. 1 is a block diagram of an exemplary networking device in accordance with the invention.
Figure 2:
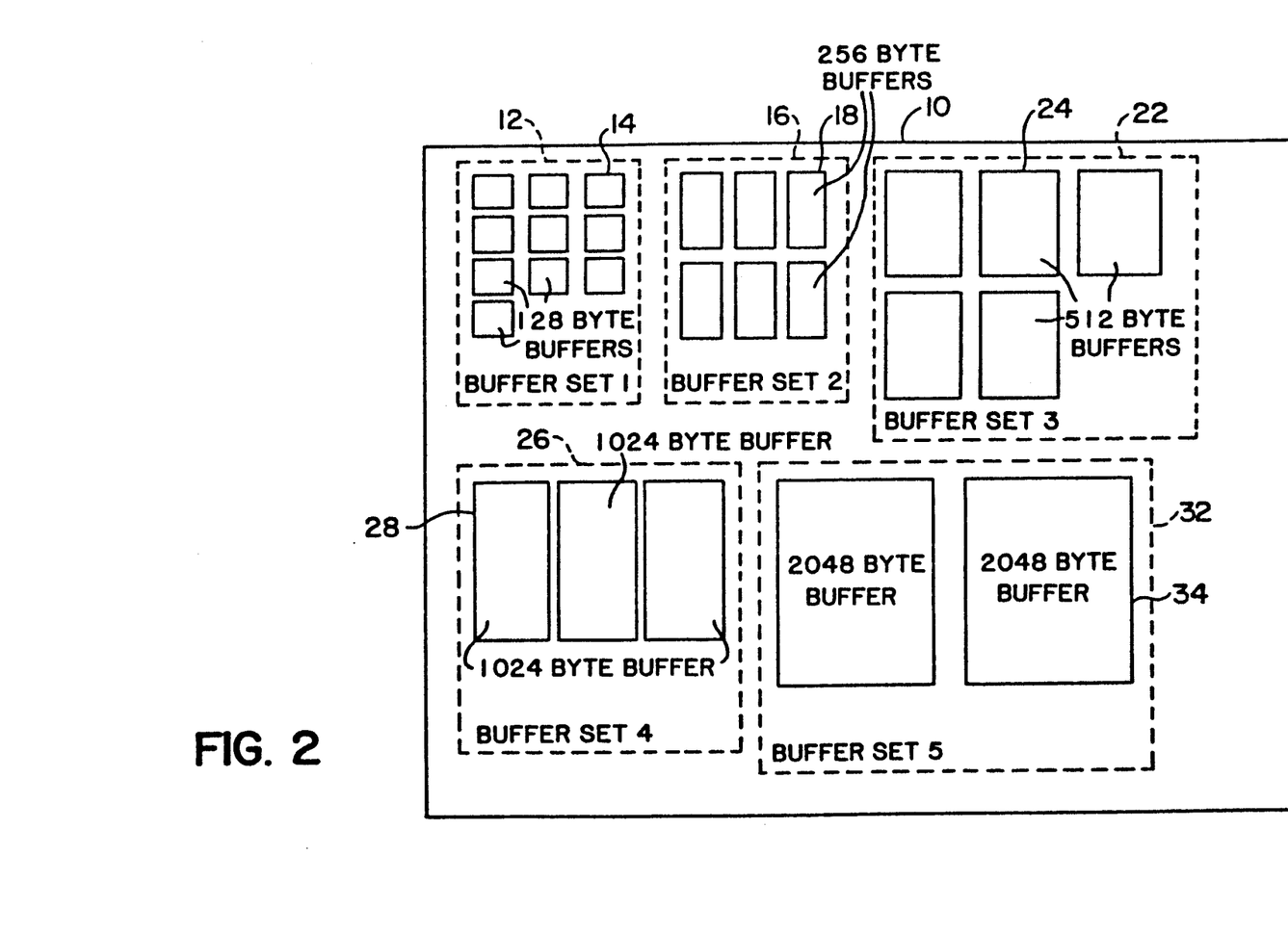
FIG. 2 is a block diagram of the buffer memory shown in FIG. 1.

The present invention is embodied in a networking device 90 (shown in FIG. 1) having a buffer memory 10 (shown in detail in FIG. 2). According to one aspect of the present invention, available space in a buffer memory 10 is partitioned into sets 12, 16, 22, 26, 32 of respective buffers 14, 18, 24, 28 and 34. The buffers within each respective set have the same size as one another. The size of the buffers in each set is different from the sizes of the buffers in every other set. A fixed, predetermined, ordered sequence of buffer sets is used to allocate buffers to store all incoming data packets.

According to another aspect of the invention, the first portion of the data in every packet is stored in a (first) allocated buffer (e.g., buffer 14) having a size equal to the first size in the ordered sequence of buffer sets. If the data packet size is smaller than or equal to the size of the allocated buffer, then the size of the first portion is equal to the size of the packet (The entire packet is stored in the allocated buffer). Otherwise, the size of the first portion is equal to the size of the allocated buffer.

It is not necessary to pre-allocate all of the buffers that are used to store a given packet. If the packet is larger than the (first) allocated buffer, then as soon as the allocated buffer is full, a second buffer (e.g., buffer 24) is allocated to storing the packet. The size of the second buffer is equal to the second size in the ordered sequence of buffer sets. If the size of the remaining data (the total data packet size minus the size of the first portion) is less than the size of the second allocated buffer, then the second portion size is equal to the remainder of the data. Otherwise, the size of the second portion is equal to the size of the second allocated buffer. Once the second buffer is allocated, the ND 90 begins to store data into the second buffer.

If the packet still exceeds the sizes of the first and second allocated buffers combined, then a third buffer (e.g., buffer 28) is allocated as soon as the second buffer is filled. The size of the third buffer is the same as the third size in the predetermined ordered sequence of sets of buffers. The next portion of the packet is stored into the third portion. This procedure is repeated until the entire packet is stored in the buffer memory.

Preferably, the buffer sizes in the different sets of buffers, as well as the predetermined ordered sequence of buffer sets, are allocated on the basis of observed or expected traffic for the specific environment in which the system operates.

DETAILED DESCRIPTION

The present invention is embodied in a method and apparatus for storing data packets in a networking device (ND) 90 as shown in FIG. 1. Data are received by way of at least one network interface 40a, and may be received from a plurality of network interfaces 40a-40n. Network interfaces 40a-40n couple ND 90 to a plurality of networks 50a-50n, which may use the FDDI protocol, Ethernet TM, or Token Ring. The data may also be received by way of a host interfaces 60a coupled to a host system 70a. For example, the host interface 60a may be a microchannel bus. There may optionally be a plurality of host interfaces 60a-60n coupled to a plurality of host systems 70a-70n.

The data are stored within buffer memory 10. These data include packets awaiting transmission on the network 50a, unacknowledged transmitted packets, and packets received and not fully processed and transmitted to their destinations. Once the packets are stored, the data in buffer memory 10 are then transmitted to the host system 70a or another network 50n. The data are also received from host 70a, stored in buffer memory 10, and transmitted out to the network 50a or back to the host system 70.

A processing unit 80 may exist inside ND 90 to run all the software executed in the ND 90. Processing unit 80 may be a general purpose microprocessor such as an Intel 80386 processor, an 80960 processor, a digital signal processor (DSP), or a specially designed processing unit. Processing unit 80 receives data packets and control messages from all possible packet generation sources such as networks 50a-50n, host systems 70a-70n, or other source. Processing unit 80 then responds by transmitting at least one packet or control message to at least one designated destination, such as network 50a or host system 70a.

Within ND 90, an internal connectivity component 40, which may be a data bus, switch or any equivalent connection device, provides a data path among processing unit 80, buffer memory 10, a buffer memory management unit 20, network interfaces 40a-40n and host system interfaces 60a-60n. A data packet received by the networking device 90 is stored in one or more buffers 14, 18, 24, 28 and 34 within buffer memory 10 before forwarding the data packet to its destination or discarding it.

To strike the desired balance between memory space utilization and buffer management overhead, the buffer memory 10 is partitioned into at least two, and if appropriate, several, sets 12, 16, 22, 26, 32 of differently sized buffers. FIG. 2 shows the buffer memory partitioning. Buffers within each respective set 12, 16, 22, 26 and 32 have the same respective size. A predetermined sequence of buffer sets (or buffer set indicators) is used for buffer allocation when storing data into empty buffers within the sets. The determination of the buffer size for each buffer set is based upon an empirically observed packet size pattern under the working environment for the networks 50a-50n into which ND 90 is installed. By monitoring network traffic, a probability distribution function for the packet size is obtained. This distribution function is typically a multi-modal function, depending on the underlying network and protocol suite used.

This empirical information is used to determine the desired buffer sizes and buffer allocation sequence. In an ND 90 attached to a plurality of networks 50a-50n, the predetermined buffer allocation sequences may be implemented for each network 50a-50n attached, if their characteristics are very different from one another. In the latter case, the probability distribution function of received packet size for each individual network 50a-50n attached is used to decide the sequence for each respective network interface 40a-40n, instead of using the probability distribution function of received packet size for the entire networking device 90.

FIG. 2 shows an exemplary buffer memory 10 suitable for use in an embodiment of the invention. Buffer memory 10 has buffers of five different sizes 14, 18, 24, 28 and 34, assigned to respective sets of buffers 12, 16, 22, 26 and 32. The buffers 14, 18, 24, 28, 34 within each set 12, 16, 22, 26 and 32 have the same size as other buffers within the same set. Each set (e.g., set 12) includes buffers of a size which is different from the sizes of the buffers in every other set (e.g., sets 16, 22, 26 and 32). For example, set 12 may include 128 byte buffers 14; set 16 may include 256 byte buffers 18; set 22 may include 512 byte buffers 24; set 26 may include 1024 byte buffers 28; and set 32 may include 2048 byte buffers 34.

The predetermined buffer allocation sequence is in the form of an ordered list of buffer sets. For example, the sequence may be: 12, 32, 16, 32, 12. The sequence may be stored in an array within buffer memory management unit 20. The values of the sequence identify the sets from which successive buffers may be allocated for storing a given packet. Any buffer set may be included more than one time in the sequence.

Figure 3:
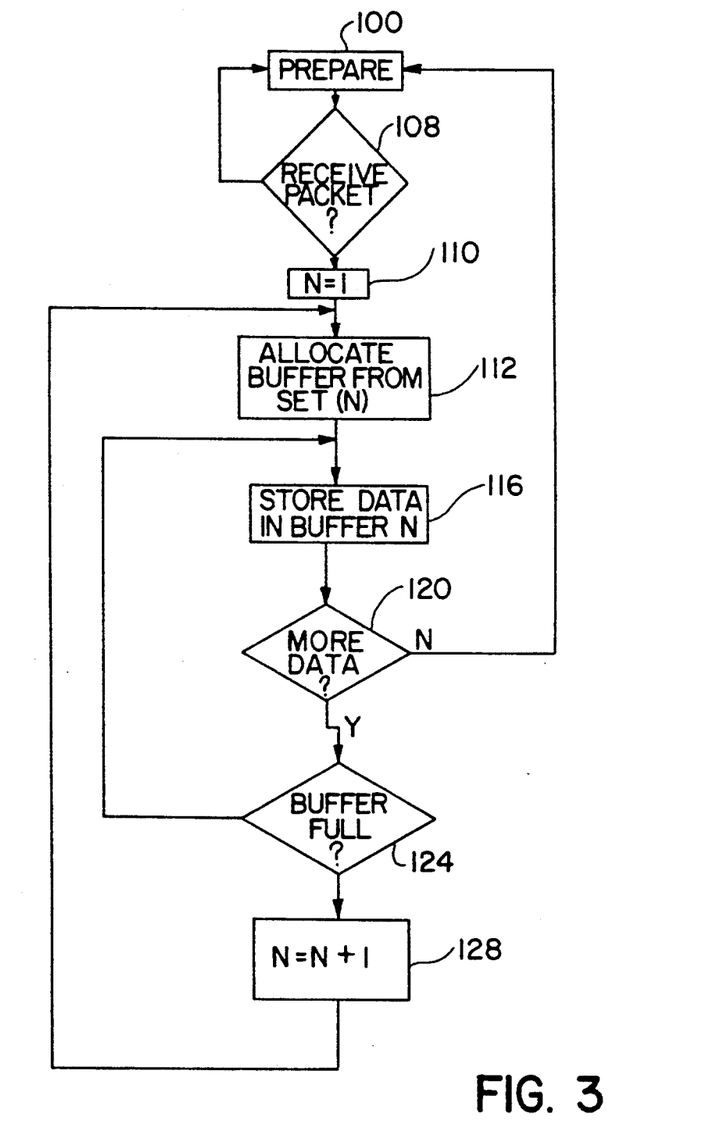
FIG. 3 is a flow diagram showing a method of using the networking device shown in FIG. 1.

FIG. 3 is a flow diagram showing a method of storing data in accordance with the invention. At step 100, ND 90 prepares to receive data packets. At step 108, a data packet is received by the network interface 40a from an attached network 50a. At step 112, network interface 40a requires a buffer. A buffer is allocated from the plurality of buffers. Any available buffer from the appropriate set may be used. The allocated buffer has a size equal to the first size in the ordered sequence. The ND 90 prepares to store the data packet.

At step 116, a portion of the received data packet is stored in the allocated buffer while the remaining data in the packet are received from the network. The portion is equal in size to the size of the allocated buffer if the packet size is greater than or equal to the size of the allocated buffer. The portion is equal in size to the packet size if the packet size is less than the size of the allocated buffer.

At step 120, if the received packet has no more data, the process is complete. If, at step 124, there are more data in the packet but the allocated buffer is full, (i.e., if the packet size is greater than the size of the first buffer in the predetermined sequence) then the next buffer size is determined at step 128. A further buffer having the next buffer size in the predetermined sequence is then allocated at step 112. Each time step 112 is executed, further buffers are allocated so that their respective sizes are in accordance with the predetermined ordered sequence of buffer sets. Steps 112 through 128 are repeated until all of the data in the packet are stored, storing further portions of the data packet into respective further buffers allocated from the plurality of buffers.

Figure 4:
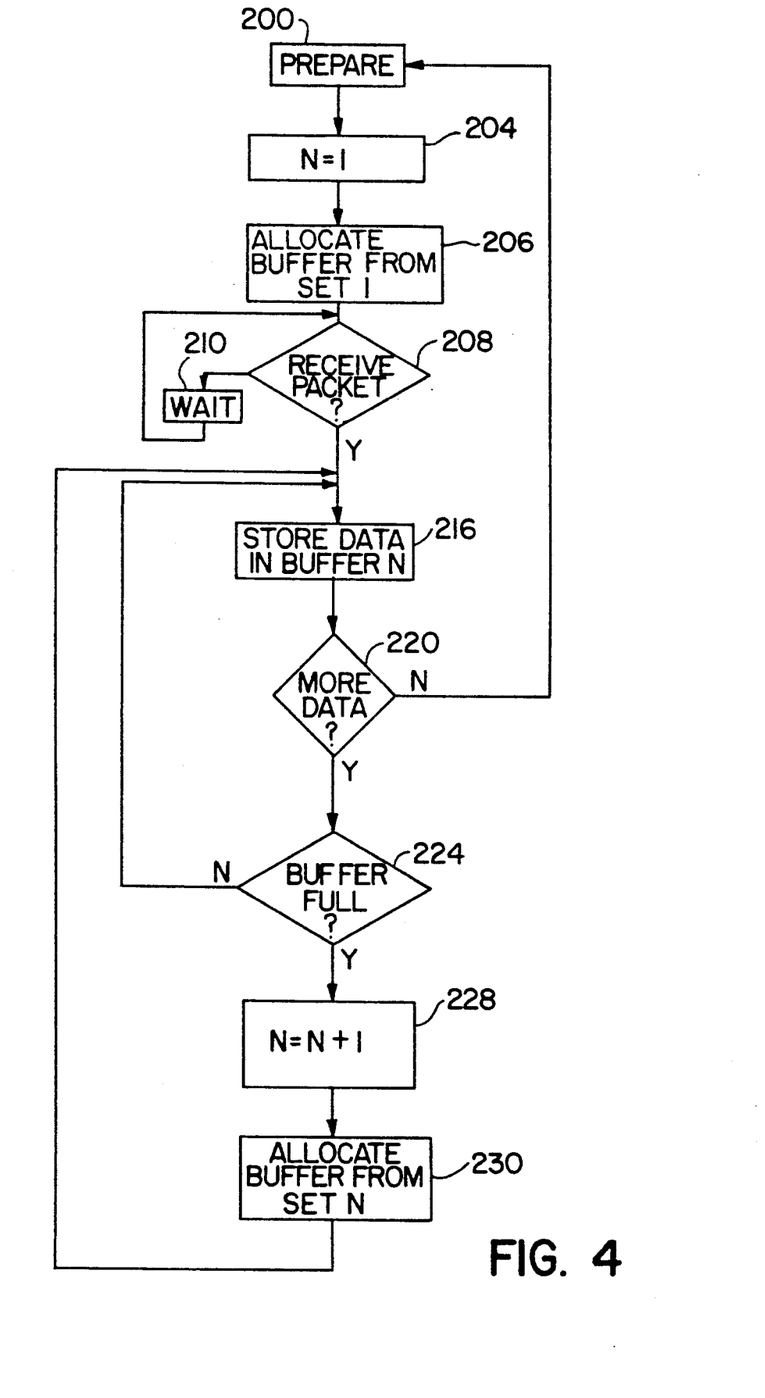
FIG. 4 is a flow diagram showing an alternative method of using the networking device shown in FIG. 1.

FIG. 4 shows a variation of the method shown in FIG. 3. FIG. 4 shows a method in which a look-ahead allocation scheme is used for allocating the first buffer. This may result in quicker storage for the first portion of each data packet. At steps 204 and 206, a buffer is allocated from the first set in the sequence of buffer sets before the data packet arrives. At steps 208 and 210, the ND waits for receipt of a data packet. Steps 216 through 228 are the same as respective steps 116 through 128 in the method of FIG. 3. At step 230, successive buffers are allocated from the plurality of buffers as each allocated buffer is filled with data from the data packet. Control is then returned to step 216, where more data are stored in the buffers.

The following examples are for purposes of illustration only, and do not limit the range of possible embodiments of the invention. Furthermore, the optimal balance of buffer memory 10 utilization and memory management overhead depends on the individual user's traffic pattern, buffer memory capacity and memory management unit 20 speed. Therefore, there is no single preferred sequence; the optimal mix may vary for each user.

Figure 5:
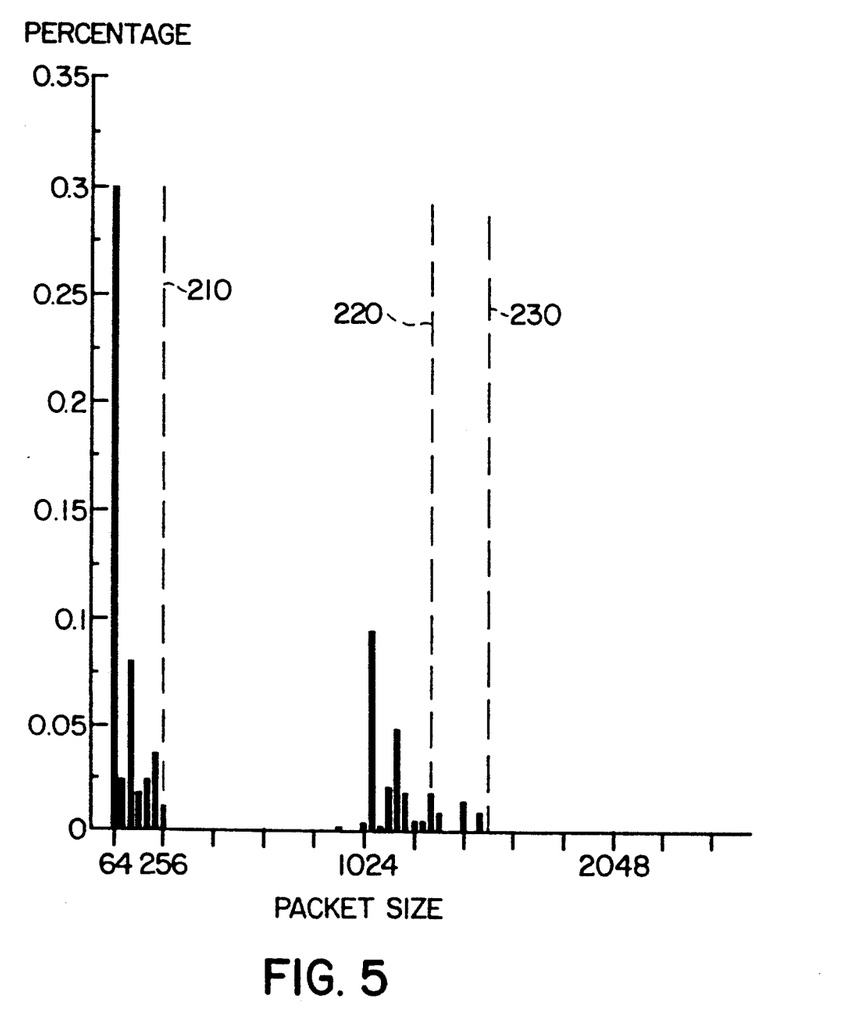
FIG. 5 is a histogram showing an exemplary distribution of packet sizes processed by the networking device shown in FIG. 1.
Figure 6:
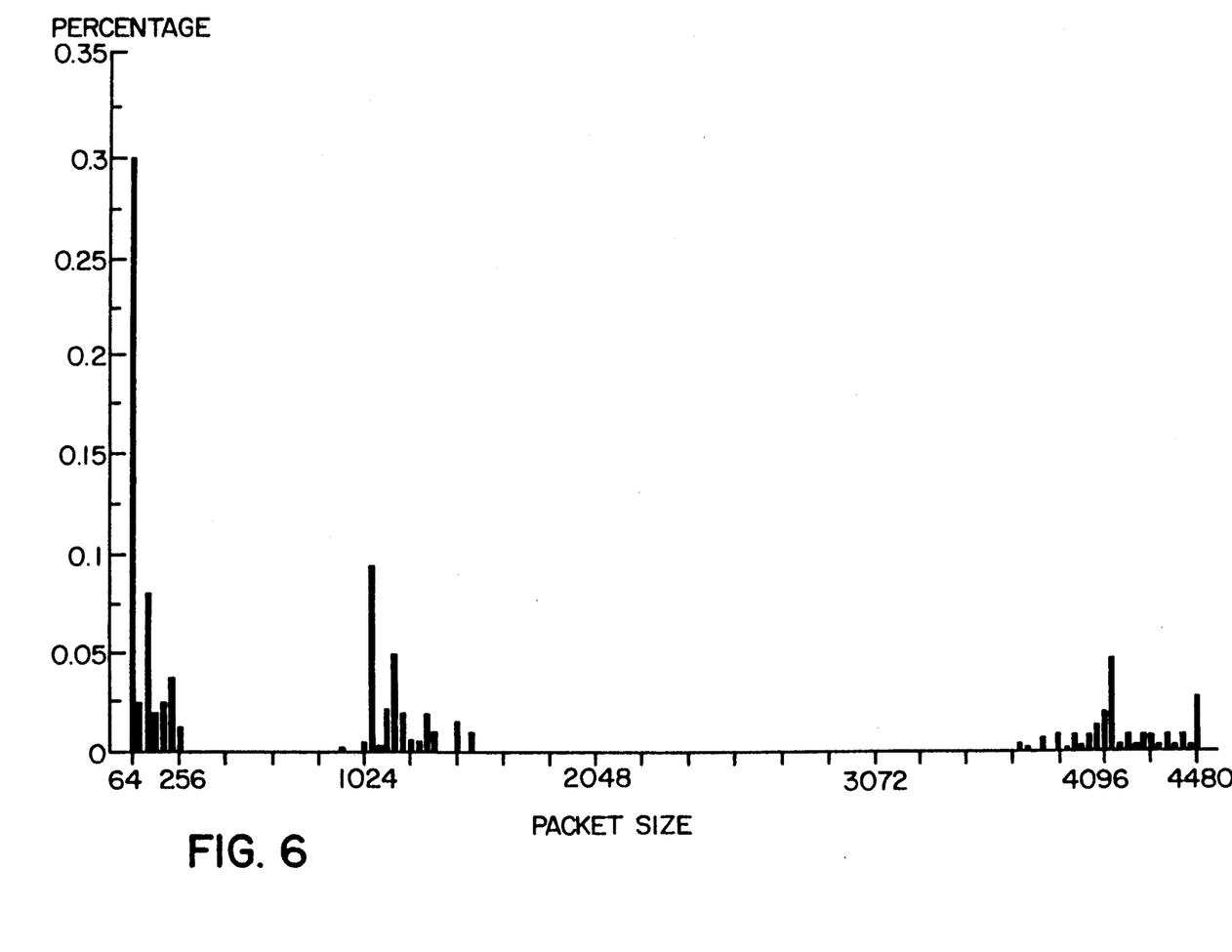
FIG. 6 is a histogram showing a further exemplary distribution of packet sizes processed by the networking device shown in FIG. 1.

FIGS. 5 and 6 are histograms which show the distribution of packet sizes in two different networks. FIG. 5 shows a packet size profile which may occur in an Ethernet ™ network. The maximum packet size is 1500 bytes. In FIG. 5, the packet size probability density function is bimodal. Most of the packets fall in one of two distinct ranges. Many of the packets are less than 256 bytes long, i.e., they lie to the left of line 210. There are very few packets between 256 and 1024 bytes long. Of the remaining packets, most are between 1024 bytes and 1280 bytes. They lie to the left of line 220. The remaining packets are less than 1500 bytes long. They are all between line 220 and line 230.

In accordance with the invention, a simple sequence of buffer sets may be 16-26-16 (representing, in order, the small, large and small buffer sets shown in FIG. 2), where the small buffer set 16 includes small buffers 18 having a size of 256 bytes. The large buffer set 26 includes large buffers 28 having a size of 1024 bytes. For this sequence, the first size in the ordered sequence is the size of the smallest buffer in the plurality of buffers. Any packet 256 bytes or smaller in size is stored in a single buffer 18. Packets between 256 and 1280 bytes long are stored in one small buffer 18 plus one large buffer 28. Packets between 1280 and 1500 bytes are stored in a first small buffer 18, one large buffer 28 and a second small buffer 18.

FIG. 6 is a histogram which shows a more complex traffic distribution in which the packet sizes are clustered in three general ranges. These ranges are: small (less than 256 bytes), medium (between 900 and 1500 bytes) and large (between 3500 and 4500 bytes). This type of distribution may occur in an FDDI network, in which packets of up to 4500 bytes in length are transmitted. Several alternative sequences may potentially be used for such a network.

An exemplary buffer size sequence in accordance with the invention may use small (256 byte) buffers 18 and large (2048 byte) buffers 34, in a sequence such as 18-34-34-18 (small-large-large-small, or SLLS), which are allocated using the associated buffer set sequence 16-32-32-16. Packets of 256 bytes or less are stored in one small buffer 18. Packets between 256 and 2304 bytes are stored in one small buffer 18 and one large buffer 34. Packets of up to 4352 bytes are stored in one small buffer 18 and two large buffers 34. Larger packets are stored in a small buffer 18, two large buffers 34 and an additional small buffer 18.

Another alternative may be to use three buffer sizes small (256 byte) buffers 18, medium (1024 byte) buffers 28 and large (2048 byte) buffers 34. The buffer set sequence may be, for example, 16-26-16-32-26 (small-medium-small-large-medium, or SMSLM). Packets of up to 256 bytes or less are stored in one small buffer 18. Packets between 256 and 1280 bytes are stored in a small buffer 18 and a medium buffer 28. Packets having between 1280 and 1536 bytes may be stored in one small buffer 18, one medium buffer 28, and a further small buffer 18. Packets between 1536 and 3584 bytes (not shown) are stored in one small buffer 18, one medium buffer 28, a further small buffer 18 and a large buffer 34. Packets larger than 3584 bytes are stored in one small buffer 18, one medium buffer 28, a further small buffer 18, a large buffer 34 and a further medium buffer 28. This sequence uses the buffer memory 10 space more efficiently than the SLLS sequence described above. On the other hand, the SMSLM sequence requires more overhead than the SLLS sequence, for two reasons. First, packets between 1280 and 2304 bytes are stored in three buffers using SMSLM, versus only two buffers in the SLLS sequence. Second, packets which are larger than 3584 are stored in five buffers using SMSLM, versus only four buffers using SLLS.

The two examples cited above each include packet size distributions in which a large number of packets are clustered around the size of the smallest buffer 14 in the buffer memory 10. Other types of traffic loads (not shown) are equally possible, for which the first buffer size in the predetermined ordered sequence is the largest buffer size. For example, if the packet sizes are all uniformly distributed between 600 bytes and 1500 bytes, then it may be desirable to use a large-small (LS) sequence which begins with a 1024 byte buffer 28, followed by a 512 byte buffer 24.

Furthermore, it is understood by one skilled in the art that any buffer sizes, and any sequence of buffer sets may be used in accordance with the invention, to achieve the user's desired balance between buffer memory utilization and buffer memory management overhead.

It is understood by one skilled in the art that many variations of the embodiments described herein are contemplated. While the invention has been described in terms of exemplary embodiments, it is contemplated that it may be practiced as outlined above with modifications within the spirit and scope of the appended claims.

What is claimed:

1. A method for storing a data packet having a packet size in a networking device having a plurality of buffers, each buffer having a respective size, comprising the steps of:
   (a) partitioning the plurality of buffers into a plurality of sets, each set having buffers of a respectively different size;
   (b) establishing an ordered sequence of sets of buffers, one of said sets being a first set in said ordered sequence;
   (c) allocating a buffer from said first set for temporary storage of a portion of the data packet, said allocated buffer having a size;
   (d) storing the portion of the data packet into said allocated buffer; and
   (e) allocating an additional buffer from an additional one of said plurality of sets of buffers in accordance with said ordered sequence of sets of buffers for temporary storage of a further portion of the data packet and storing the further portion of said data packet into said additional further if said packet size is greater than said size of said allocated buffer.

2. A method in accordance with claim 1, wherein step (e) is repeated until all of the portions of said packet are stored within said plurality of buffers.

3. A method in accordance with claim 1, wherein said portion is equal in size to said size of said allocated buffer if said packet size is greater than said size of said allocated buffer.

4. A method in accordance with claim 1, wherein the portion is equal in size to the size of the allocated buffer if the packet size is equal to the size of said allocated buffer.

5. A method in accordance with claim 1, wherein the portion is equal in size to the packet size if said packet size is less than the size of said allocated buffer.

6. A method in accordance with claim 1, wherein the first set in said ordered sequence includes buffers which are equal in size to the smallest buffer in said plurality of buffers.

7. A method in accordance with claim 1, wherein the first set in said ordered sequence includes buffers which are equal in size to the largest buffer in said plurality of buffers.

8. A method in accordance with claim 1, wherein said further portion is equal in size to a difference between said packet size and said size of said allocated buffer.

9. A method in accordance with claim 1, wherein one of said sets is a second set in said ordered sequence, said second set includes buffers having a respective size, and said further portion is equal in size to said size of said buffers in said second set.

10. A method in accordance with claim 1, further comprising the step of receiving the data packet by the networking device after the step of allocating the allocated buffer from the first set of buffers.

11. A method in accordance with claim 1, further comprising the step of waiting until said allocated buffer is full before allocating said additional buffer.

12. A method in accordance with claim 1, wherein at least one of said sets of buffers is included at least two times in said ordered sequence of sets of buffers.

13. Apparatus for storing a data packet having a packet size in a networking device, comprising:
   a plurality of sets of buffers, each set having buffers of a respectively different size;
   means for establishing an ordered sequence of sets of buffers, one of said sets of buffers being a first set in said ordered sequence;
   means for allocating a buffer from said first set of buffers for temporary storage of a portion of the data packet, said allocated buffer having a size;
   means for storing the portion of the data packet into said allocated buffer; and
   means for allocating an additional buffer from an additional one of said plurality of sets of buffers in accordance with said ordered sequence of sets of buffers for temporary storage of a further portion of the data packet, and for storing the further portion of said data packet into said additional buffer if said packet size is greater than said size of said allocated buffer.

14. Apparatus in accordance with claim 13, wherein said buffer allocating means include a buffer memory management unit.

15. Apparatus in accordance with claim 13, wherein said networking device is coupled to a plurality of networks which transmit data packets to said networking device and receive data packets from said networking device.

16. Apparatus in accordance with claim 13, wherein said networking device is coupled to a plurality of host systems which receive data packets from said networking device and transmit data packets to said networking device.

* * * * *